(12) United States Patent
Vlahovic et al.

(10) Patent No.: US 12,488,366 B2
(45) Date of Patent: *Dec. 2, 2025

(54) GENERATING A TOKENIZED REPUTATION SCORE

(71) Applicant: eBay Inc., San Jose, CA (US)

(72) Inventors: Tatjana Vlahovic, San Jose, CA (US); Someshekhar Banerjee, Pleasanton, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,609

(22) Filed: Jan. 30, 2024

(65) Prior Publication Data

US 2024/0169388 A1  May 23, 2024

Related U.S. Application Data

(63) Continuation of application No. 17/497,006, filed on Oct. 8, 2021, now Pat. No. 11,922,453.

(51) Int. Cl.
*G06Q 30/02* (2023.01)
*G06Q 20/40* (2012.01)
*G06Q 30/0226* (2023.01)

(52) U.S. Cl.
CPC ..... *G06Q 30/0233* (2013.01); *G06Q 20/4016* (2013.01); *G06Q 2220/00* (2013.01)

(58) Field of Classification Search
CPC ........... G06Q 30/0233; G06Q 20/4016; G06Q 2220/00; G06Q 30/0282; G06Q 30/0609; G06Q 30/0207–30/0277

See application file for complete search history.

(56) References Cited

U.S. PATENT DOCUMENTS 8,719,154 B2 * 5/2014 Shastry .............. G06Q 30/0283
 705/39
9,703,986 B1  7/2017 Ashley et al.
(Continued)

FOREIGN PATENT DOCUMENTS

KR  20200044363 A  4/2020

OTHER PUBLICATIONS

U.S. Appl. No. 17/497,006, filed Jul. 17, 2023, "Non-Final Office Action", U.S. Appl. No. 17/497,006, filed Jul. 17, 2023, 11 pages.
(Continued)

*Primary Examiner* — Thuy N Nguyen
(74) *Attorney, Agent, or Firm* — FIG. 1 Patents

(57) ABSTRACT

Systems and methods for generating tokenized reputation scores are described. In one example, a service provider system receives data describing user activity associated with a service provider account and determines that the user activity is eligible for a reputation reward of reputation tokens. The service provider system initiates a calculation of the reputation reward based on the data describing the user activity. Further, the service provider system verifies a transfer of reputation tokens to a blockchain account address associated with the service provider account, where the reputation tokens are based on the reputation reward calculated. The service provider system generates a reputation score based on an amount of reputation tokens associated with the blockchain account address and generates an indication of the reputation score. The indication of the reputation score is displayed in relation to a representation of the service provider account.

20 Claims, 8 Drawing Sheets

(56) References Cited

U.S. PATENT DOCUMENTS

| | | | |
|---|---|---|---|
| 10,878,415 B1* | 12/2020 | Yang | G06Q 20/0658 |
| 11,188,909 B2* | 11/2021 | Lee | G06Q 20/389 |
| 11,392,947 B1* | 7/2022 | Prasad | G06Q 20/40155 |
| 11,922,453 B2 | 3/2024 | Vlahovic et al. | |
| 2006/0184440 A1* | 8/2006 | Britti | G06Q 40/00 705/35 |
| 2009/0006115 A1* | 1/2009 | Schwarz | G06Q 10/067 705/348 |
| 2013/0298244 A1* | 11/2013 | Kumar | G06F 21/51 726/25 |
| 2015/0302400 A1 | 10/2015 | Metral | |
| 2017/0345000 A1* | 11/2017 | Kohli | G06Q 30/0233 |
| 2018/0197166 A1* | 7/2018 | Holman | G06Q 20/22 |
| 2019/0122155 A1* | 4/2019 | Irazabal | G06Q 10/06311 |
| 2019/0197574 A1* | 6/2019 | Berman | G06Q 20/3224 |
| 2019/0362826 A1* | 11/2019 | Viskovich | G06Q 20/065 |
| 2020/0005286 A1* | 1/2020 | Sewell | G06Q 20/0658 |
| 2020/0027089 A1* | 1/2020 | Kuchar | G06Q 20/4016 |
| 2020/0034869 A1* | 1/2020 | Harrison | G06Q 20/3678 |
| 2020/0052917 A1* | 2/2020 | Corral | H04L 67/53 |
| 2020/0311699 A1* | 10/2020 | Ranjit | G06Q 20/38215 |
| 2020/0313897 A1* | 10/2020 | Heath | G06Q 20/3827 |
| 2020/0401729 A1 | 12/2020 | Dassenno | |
| 2020/0410729 A1 | 12/2020 | Zhao | |
| 2021/0004739 A1* | 1/2021 | Gill | G06Q 50/26 |
| 2021/0073282 A1* | 3/2021 | Hunter | G06F 8/33 |
| 2021/0073287 A1* | 3/2021 | Hunter | H04L 63/123 |
| 2021/0081934 A1* | 3/2021 | Huang | H04L 9/3297 |
| 2021/0083849 A1* | 3/2021 | Liang | H04L 63/123 |
| 2021/0119785 A1* | 4/2021 | Ben-Reuven | H04L 9/3239 |
| 2021/0158443 A1 | 5/2021 | Kilgore et al. | |
| 2021/0176340 A1* | 6/2021 | Rose | G06Q 20/405 |
| 2021/0182840 A1* | 6/2021 | Gundavelli | G06Q 20/3827 |
| 2021/0203480 A1* | 7/2021 | Wu | H04L 9/0637 |
| 2021/0374791 A1* | 12/2021 | Kim | G06Q 20/3829 |
| 2022/0156776 A1* | 5/2022 | Long | G06Q 30/0215 |
| 2022/0255764 A1* | 8/2022 | Li | G06F 21/606 |
| 2022/0291666 A1* | 9/2022 | Cella | G06F 18/241 |
| 2022/0301092 A1* | 9/2022 | Groswirt | G06Q 20/0655 |
| 2022/0398538 A1* | 12/2022 | Jakobsson | H04L 9/3213 |
| 2023/0004970 A1* | 1/2023 | Jakobsson | G06Q 20/407 |
| 2023/0113795 A1 | 4/2023 | Vlahovic et al. | |
| 2023/0177515 A1* | 6/2023 | Bravick | H04L 9/50 705/75 |

OTHER PUBLICATIONS

U.S. Appl. No. 17/497,006, filed Oct. 30, 2023, "Notice of Allowance", U.S. Appl. No. 17/497,006, filed Oct. 30, 2023, 7 pages.

22199733.1, "Extended European Search Report", EP Application No. 22199733.1, Feb. 17, 2023, 10 pages.

Ge, Yunhan, et al., "Heterogeneous Identity Unified Management System Based on Trustworthiness Evaluation Model", BDET 2021: 2021 the 3rd International Conference on Big Data Engineering and Technology (BDET) [retrieved Feb. 22, 2023]. Retrieved from the Internet <https://doi.org/10.1145/3474944.3474957>, Oct. 15, 2021, 8 pages.

Li, Haochen, et al., "Reputation-Based Trustworthy Supply Chain Management Using Smart Contract", In: Qiu, M. (eds) Algorithms and Architectures for Parallel Processing. ICA3PP 2020. Lecture Notes in Computer Science, vol. 12454. Springer, Cham. [retrieved Feb. 22, 2023]. Retrieved from the Internet <https://doi.org/10.1007/978-3-030-60248-2_3>, Sep. 29, 2020, 15 pages.

"Foreign Office Action", EP Application No. 22199733.1, Apr. 8, 2025, 9 pages.

Crypto Apis, "Crypto APIs 2.0—the easiest way to interact with Blockchains", retried at «https://web.archive.org/web/20210926233614/https://cryptoapis.io/» on Mar. 4, 2025, Sep. 25, 2021.

Wen, et al., "Blockchain Events", Crypto Apis, retrieved at «https://web.archive.org/web/20210926005933/https://cryptoapis.io/products/blockchain-events» on Mar. 4, 2025, Sep. 26, 2021, 2 pages.

\* cited by examiner

GENERATING A TOKENIZED REPUTATION SCORE

RELATED APPLICATION

This application is a continuation of and claims priority to U.S. patent application Ser. No. 17/497,006, filed on Oct. 8, 2021, the entire disclosure of which is hereby incorporated by reference.

BACKGROUND

The rise of the Internet has empowered strangers from around the world to interact online with ease. However, establishing reputability used as a basis to interact online, especially in higher stakes interactions such as economic transactions, is fundamentally different from conventional techniques used to establish a reputation, which have evolved in human societies over thousands of years to address physical world challenges.

Conventional techniques for establishing a reputation, for example, are conducted locally and in person as part of personal interaction and inspection with physical items in the physical world. Via conventional techniques, people often interact physically with the same people and over time learn whom they can trust. Even when one's personal, physical interactions are limited, a physical entity and its corresponding location makes it easy for people to learn more about physical entities from their peers. Different forms of signaling also establish reputability, such as significant expenditures and hosted interactions that indicate that an entity is likely reputable due to the high sunk cost of the initial expenditure. Think, for example, office buildings used by insurance providers to indicate stability and wealth. Reputability in the physical world is also built over many years, such as by leading auction houses that are hundreds of years old.

Although conventional techniques for establishing reputability are satisfactory for challenges presented by the physical world, the conventional techniques do not adequately address the technical challenges of the online world. By way of example, people often interact via the Internet with pseudonymous or anonymous strangers, people rarely repeat interactions with other people, listing items on the Internet is generally free and effortless, and people can easily discard online accounts used for disreputable activities with ease. Conventional techniques for establishing reputability simply do not address the technical challenges presented by Internet, resulting in inefficiency, frustration, lost opportunities, damages, and other adverse outcomes for people and entities interacting via the Internet.

SUMMARY

Techniques for generating a tokenized reputation score are described that overcome the challenges of establishing a reputation online, which are not addressed via conventional reputation techniques. This helps to prevent adverse outcomes for users, service provider accounts, and service provider platforms. These techniques are performed by leveraging a blockchain such that cryptographic tokens establishing reputation—reputation tokens—are utilized to generate a tokenized reputation score. Throughout this discussion, "tokenized reputation score" and "reputation score" are used interchangeably. By virtue of leveraging a blockchain for these techniques, additional benefits are conferred, which as further discussed throughout. By way of example, participants of these techniques are further empowered due to personal ownership and possession of the reputation tokens. In this way, people can invest in an indication of their reputability that can be freely utilized among many service provider systems because the data is owned by the user instead of by a service provider system.

In one example, a service provider system receives data describing user activity associated with a service provider account of the service provider system. The service provider system determines whether the user activity is eligible for a reputation reward, and if so, the service provider system initiates a calculation of the reputation reward of reputation tokens based on the data describing the user activity; the reputation reward of reputation tokens is to be transferred to a blockchain account address associated with a service provider account. The service provider system verifies that the reputation tokens have been transferred to the blockchain account address associated with the service provider account. Based on an amount of reputation tokens associated with the blockchain account address, the service provider system generates a reputation score. Further, the service provider system generates an indication of the reputation score that is displayable in relation to the service provider account. The service provider system displays the indication of the reputation score in relation to a representation of the service provider account.

In another example, a service provider system receives data describing user activity associated with a service provider account of the service provider system. The service provider system determines whether the user activity is eligible for a reputation reward, and if so, the service provider system invokes a smart contract of a blockchain system to initiate a calculation of an amount of reputation tokens to be minted and/or transferred as a reputation reward. To continue this example, the smart contract orchestrates a computation of the reputation reward with an oracle that is configured to execute an algorithm to compute the reputation reward based on the user activity of the service provider account. Responsive to computation of the reputation reward, the smart contract mints and/or transfers the amount of reputation tokens as a reputation reward to a blockchain account address associated with the service provider account. The service provider system generates a reputation score based on the amount of reputation tokens associated with the blockchain account address associated with the service provider account. In this manner, the service provider system generates a tokenized reputation score and/or an indication of a tokenized reputation score associated with a service provider account, thus overcoming the challenges left unaddressed by conventional techniques for establishing reputability.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
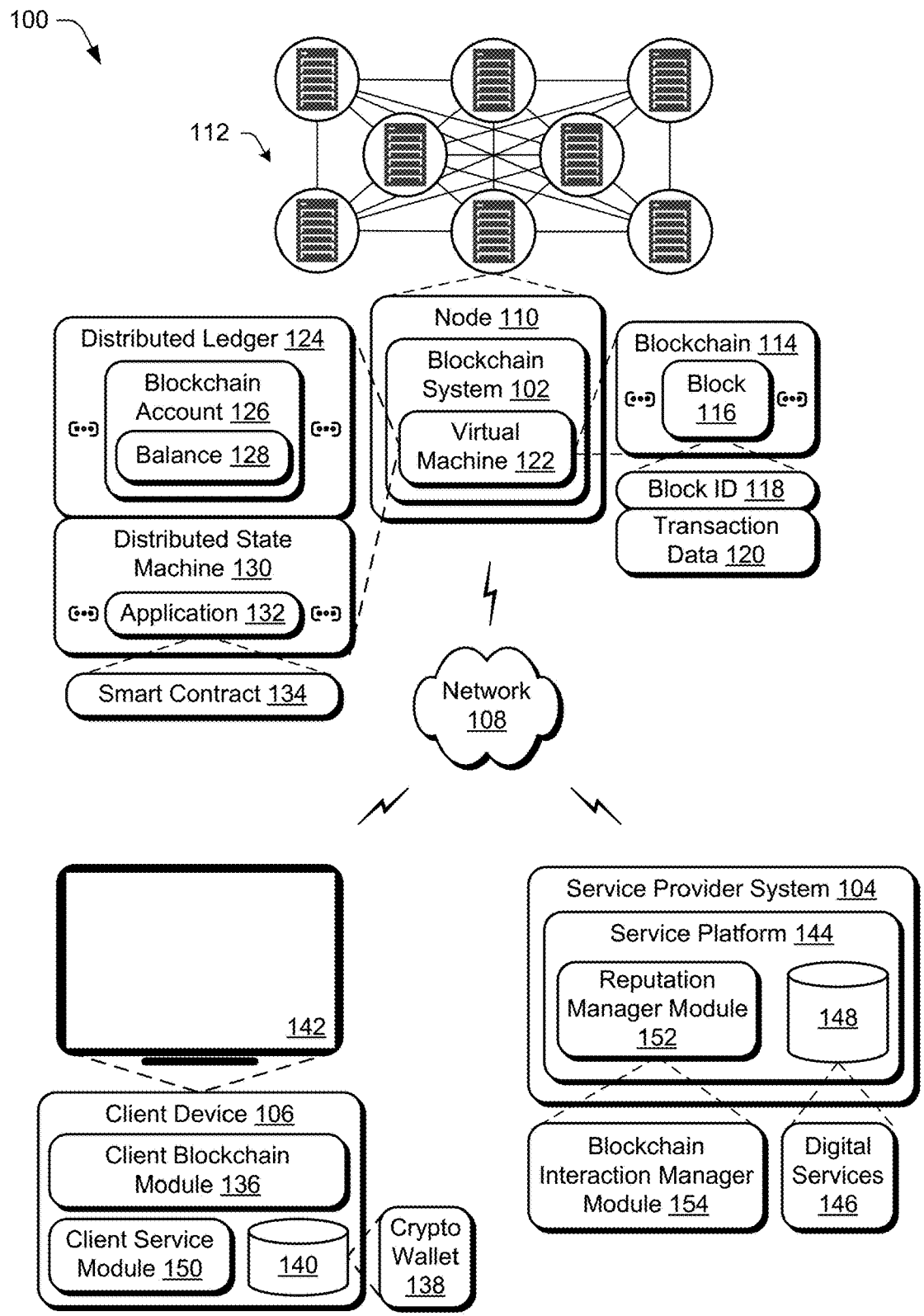
FIG. 1 is an illustration of an environment in an example blockchain implementation that is operable to employ tokenized reputation score generation techniques described herein.

Although conventional reputation techniques have been developed in human societies over thousands of years to satisfactorily address the challenges of the physical world, these techniques fail to address the challenges presented by the online world. Because of this, adverse outcomes such as damages, frustration, and inefficiency result for people and entities when interacting online.

Moreover, alternative reputation techniques that have been developed to address these challenges are often limited in their scope of utility. By way of example, under alternative techniques, usefulness of the inference of reputability of a service provider account of a service provider system is limited to user activity of the service provider account that conducted via the service provider system. As such, the inference of reputation built with a service provider system often does not provide a transferable indication of reputation because the data of the inference is owned and controlled by the service provider system. As such, the indication developed with the service provider system is limited to the same service provider system, and as such limits opportunities to leverage this indication outside of the system. Additionally, because the inference is owned and controlled by the service provider system, the centralized nature of this possession makes the data vulnerable to tampering, hacking, deletion, or other adverse outcomes.

To overcome these challenges, techniques are leveraged, as implemented by computing devices, to generate tokenized reputation scores. A service provider system leveraging the described techniques overcomes the challenges of conventional and alternative techniques for establishing reputation by using reputation tokens and blockchain technology. As described herein, this is performed by leveraging a blockchain such that reputation tokens are made available as reputation rewards to blockchain account addresses associated with service provider accounts based on eligible user activity of the service provider accounts.

In one example, a service provider system receives data describing a user activity associated with a service provider account. User activities include transactions (e.g., an auction), donations, reviews, bounties, contributions, receipt of positive feedback, completion of a verification of authenticity, and so forth. In one example, the service provider system passes the user activity data to a distributed storage as normalized data.

The service provider system determines whether the user activity of the service provider account is eligible for a reputation reward. The reputation reward includes cryptographic reputation tokens, in addition to other types of cryptographic tokens, e.g., cryptographic governance tokens, cryptocurrency, non-fungible tokens ("NFTs"), and so forth. In one example, the user activity is a transaction. Different types of transactions are contemplated, including instant purchase transactions, auction transactions, rental transactions, fiat currency transactions, cryptocurrency transactions, borrowing transactions, swapping transactions, NFT transactions, digital twin transactions, authenticated item transactions, and so forth.

The determination that the user activity is eligible for a reputation reward can be based on the user activity being a qualifying user activity. Various types of qualifying user activities are contemplated, examples of which include participating in a transaction, hosting a transaction, providing a review, identifying a user interface error, referring a new service provider account, and so forth. An example of an eligible user activity is a successful completion of a transaction by the service provider account. For instance, full payment by a service provider account within a predetermined amount of time after the conclusion of an auction transaction.

In one example, the service provider account determines whether a redemption criterion has been met. Redemption criteria are definable in a variety of ways. Redemption criteria, for instance, includes a probability of the user activity being fraudulent being below a predetermined threshold, a determination that a value of a reputation reward exceeds a predetermined threshold, a determination that a cost of transferring the reputation reward (e.g., a cost of gas) is below a particular threshold, or so forth.

Further, the service provider system initiates a calculation of a reputation reward based on the data describing the user activity. In one example, the service provider system initiates the transfer of reputation tokens based on the reputation reward calculated as part of initiating the calculation of the reputation reward. In another example, the service provider system initiates a calculation of the reputation reward by invoking a smart contract. By way of example, the smart contact can perform computation of a reputation reward in concert with an oracle. In another example, an oracle responsively executes a smart contract callback to execute minting and/or transfer of reputation tokens of a reputation reward that is calculated for a service provider account.

Additionally, or alternatively, the service provider system initiates calculation of the reputation reward based on a type of transaction. As discussed throughout, example types of transactions include NFT transactions, digital twin transactions, auction transactions, digital content transactions, physical item transactions, fiat currency transactions, cryptocurrency transactions, luxury item transactions, authenticated item transactions, and so forth. Additionally, or alternatively, the service provider system initiates calculation of the reputation reward based on a value of the transaction. By way of example, a higher reputation reward can be calculated based on a higher currency value transaction in comparison to a lower currency value transaction. A transaction valued at one Bitcoin, for instance, is associated with a higher reputation reward than a transaction valued at 50,000,000 satoshis, i.e., half of a Bitcoin. Other examples of higher value transactions include transactions of luxury goods, transactions of items that include certificates of authenticity, or so forth.

Based on the reputation reward calculated, reputation tokens are transferred to a blockchain account address associated with a service provider account, for instance, by a smart contract. In one example, an oracle executes a smart contract, causing the smart contract to transfer the reputation tokens based on the reputation reward calculated. The blockchain account address can, for example, be an Ethereum account address, a crypto wallet address, an external account address, or so forth. Additionally, or alternatively, the transfer of reputation tokens is via a blockchain account identifier associated with the service provider account. A blockchain account identifier can be associated with or mapped to a blockchain account address. Although a blockchain account identifier can be one of various kinds of identifiers, some examples of blockchain account identifiers include a name mapped to a blockchain account address (e.g., an Ethereum Name Service domain name, a Coinbase Wallet username, and so forth), digital content mapped to a blockchain account address, a QR code mapped to a blockchain account address, and so forth.

The service provider system verifies that reputation tokens have been transferred to a blockchain account address associated with a service provider account, where the reputation tokens are based on a reputation reward calculated. In one example, verification is made using a transaction identifier of a transfer of reputation tokens. Additionally, or alternatively, verification is performed by completing a call (e.g., to an exchange) through an application programming interface. Various techniques for verifying transfer of the blockchain account address are included, such as via query of an application of the blockchain system for reputation token data of the reputation tokens. Verification can be performed automatically and/or at predefined intervals. In one example, the service provider system is configured to monitor the transfer of reputation tokens via an application; the application is executable as part of a distributed state machine implemented by the blockchain system. The application is a collection of code and other data that is deployed using cryptographically signed transactions by nodes of the blockchain system that implement the distributed state machine. The application, once deployed, is configured to automate execution of conditions of the application as part of the blockchain. For instance, based on completion of the transfer of reputation tokens to a blockchain account address based on the reputation reward calculated.

The service provider system generates a reputation score based on an amount of reputation tokens associated with the blockchain account address. Additionally, or alternatively, the service provider system generates a reputation score based on transactional data affiliated with the blockchain account address, such as a prior transactional history of the blockchain account address, a length of the transactional history of the blockchain account address, or so forth. In an implementation, the reputation score is generated based on transactional data of the blockchain account address associated with the service provider account. A longer length of a transactional history of a blockchain account address associated with a service provider account, for instance, may result in generating a higher reputation score than a shorter length of a transactional history of a blockchain account address associated with a service provider account. In one or more examples, the generating of the reputation score is based on NFTs associated with the blockchain account address associated with the service provider account. NFTs recognized as representing reputability (e.g., a verified identity, a verified reputation score from a different system, etc.) may result in the generation of a higher reputation score.

Further, the service provider system generates an indication of a reputation score displayable in relation to a service provider account. Various types of indications can be generated via this technique, such as digital content, alphanumeric characters, symbols, emojis, and so forth.

The service provider system displays the indication of the reputation score generated in relation to a representation of the service provider account. Various types of representations of the service provider account can be displayed, such as digital content, alphanumeric characters, symbols, usernames, handles, images, videos, NFTs, and so forth. In one example, the representation of the service provider account is an account profile. In another example, the representation of the service provider account is a profile image. The display of the indication of the reputation score can be through various computing devices, such as client devices, Internet of Things (IoT) devices, extended reality (XR) devices, and so forth.

The described techniques also confer additional benefits. For example, the described techniques minimize friction at the service provider system because leveraging of a blockchain system minimizes use of costly intermediary parties and facilitates further automation and efficiency of the service provider system. Further, the described techniques provide users with personal ownership over reputation tokens, and therefore a universal reputation. Unlike conventional indications of reputability, such as review or feedback data owned by a service provider system, reputation token data is not owned by the service provider system. This is because the described techniques are non-custodial, rather than custodial. In short, the service provider system does not own an amount of reputation tokens associated with a blockchain account address. Instead, a user with a private key associated with a blockchain account address associated with the amount of reputation tokens has ownership of the amount of reputation tokens. In this way, a user that owns an amount of reputation tokens is empowered to evidence their universal reputation outside of the service provider system. For instance, among a plurality of service provider systems, among a plurality of governments, or so forth.

Moreover, because reputation token data is recorded via a decentralized system instead of a centralized system and is secured via cryptography, an amount of reputation tokens associated with a blockchain account address is resistant to tampering or deletion by parties without a private key associated with the blockchain account address. In contrast, data owned by a centralized system (e.g., a centralized service provider system) is vulnerable to tampering, deletion, breaches, and other adverse outcomes.

Regardless, in this manner, the service provider system generates a tokenized reputation score associated with a service provider account, thus overcoming the challenges left unaddressed by conventional techniques for establishing reputability.

In the following discussion, an example blockchain environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a blockchain environment 100 in an example implementation that is operable to employ techniques described herein. The blockchain environment 100 includes a blockchain system 102, a service provider system 104, and a client device 106 that are communicatively coupled, one to another, via a network 108. The blockchain environment 100 can also include an oracle and a distributed storage that are communicatively coupled, one to another, via a network 108, with the blockchain system 102, the service provider system 104, and the client device 106.

Computing devices that implement the blockchain environment 100 are configurable in a variety of ways. A computing device, for instance, is configurable as a desktop computer, a laptop computer, a mobile device (e.g., assuming a handheld configuration such as a tablet or mobile phone), IoT device, a wearable device, AR/VR device, a server, and so forth. Thus, a computing device ranges from full resource devices with substantial memory and processor resources to low-resource devices with limited memory and/or processing resources. Additionally, although in instances in the following discussion reference is made to a computing device in the singular, a computing device is also representative of a plurality of different devices, such as multiple servers of a server farm utilized to perform operations "over the cloud" as further described in relation to FIG. 8.

The blockchain system 102 is implemented by a plurality of nodes 110. Nodes 110 are a runtime implemented using processing, memory, and network resources of respective computing devices 112 that operate as the infrastructure of the blockchain 114. As part of this, the nodes 110 store, communicate, process, and manage data that makes up the blockchain 114. Nodes 110 are interconnected as illustrated in FIG. 1 to exchange data via the network 108, e.g., as a peer-to-peer network in a distributed and decentralized manner.

The blockchain 114 is formed using a plurality of blocks 116, illustrated in FIG. 1 as including respective block identifiers (IDs) 118 and transaction data 120. Transaction data 120 of the blocks 116 includes batches of validated transactions that are hashed and encoded. Each block 116 includes a cryptographic hash of a prior block 116 in the blockchain 114, thereby linking the blocks 116 to each other to form the blockchain 114. As a result, the blocks 116 cannot be altered retroactively without altering each subsequent block 116 in the blockchain 114 and in this way protects against attacks by malicious parties.

In order to generate the blocks 116 for addition to the blockchain 114, a node 110 is implemented as a "miner" to add a block of transactions to the blockchain 114. The other nodes 110 of the blockchain system 102 then check if the block of transactions is valid, and based on this, determine whether to accept or reject this data. If valid, the block of transactions is stored as transaction data 120 along with a block ID 118 for a respective block 116, e.g., is stored "at the end" or "at the top" of the blockchain 114 along with a hash of a previous block in the chain. The nodes 110 then broadcast this transaction history via the network 108 for sharing with other nodes 110. This acts to synchronize the blocks 116 of the blockchain 114 across the distributed architecture of the blockchain system 102. Other types of nodes 110 are also included as part of the blockchain system 102. In one such example, full nodes are nodes that store an entirety of the blockchain 114, e.g., locally in computer-readable storage media of a respective storage device. Other types of nodes are also employed to implement additional functionality to govern voting events, execution of protocol operations, rules enforcement, and so forth. In one example, the blockchain system 102 uses a Proof of Stake protocol as a consensus mechanism.

The blockchain system 102 implements a virtual machine 122 that is representative of a diverse range of functionality made possible by leveraging the blockchain 114. In a first such example, the virtual machine 122 implements a distributed ledger 124 of blockchain accounts 126 and associated balances 128 of those blockchain accounts 126. Distributed ledgers 124 support secure transfer of digital assets (e.g., tokens or coins of cryptocurrencies) between blockchain accounts 126 without management by a central authority through storage as part of the transaction data 120 of the blockchain 114. Through synchronized and distributed access supported by the blockchain 114 as described above, changes to balances 128 (e.g., a number of tokens) are visible to any entity with access to the blockchain 114. Techniques are also implemented to support management of the balances 128 across the accounts 126, e.g., to enforce rules that a respective blockchain account 126 does not transfer more coins than are available based on a balance 128 specified for that blockchain account 126.

In another example, the virtual machine 122 implements a distributed state machine 130 that supports application 132 execution. The distributed state machine 130 is implemented along with the transaction data 120 within the blocks 116 of the blockchain 114 such that the blocks describe accounts and balances as described above for the distributed ledger 124. The transaction data 120 also supports a machine state, which can change from block to block of the blockchain 114. In one example, the application 132 is executable as part of a "Turing-complete" decentralized virtual machine that is distributed across the nodes 110 of the blockchain system 102. As Turning-complete, the application 132 is computationally universal to perform computing device operations, e.g., logic or computing functions. Thus, the application 132 is executable by a processing system of a computing device as software that is storable in a computer-readable storage media of the nodes 110 to perform a variety of operations.

An example of an application 132 that is executable as part of the distributed state machine 130 is a smart contract 134. A smart contract 134 is executable automatically and without user intervention (or with partial human interaction as inputs when desired) by the nodes 110 of the distributed state machine 130. Execution of the smart contract 134 includes obtaining data from a specified data source (e.g., devices, APIs, and so forth that are accessible via the network 108), and based on this data, initiating one or more operations based on conditions described in the smart contract 134. In one or more examples, the smart contract 134 is a type of account 126 that includes a balance 128 and initiates transactions based on conditions specified by the smart contract 134, e.g., to support automated escrow and other functionalities. A variety of other examples are also contemplated that support implementation of any executable operation by a computing device using software.

Cryptocurrencies (e.g., coins of the cryptocurrency) are a native asset of the blockchain 114, and tokens are created "on top" of these blockchains. Cryptocurrencies allow individuals to make payments using their digital currency. Individuals can use tokens, however, for other reasons. By way of example, individuals can use tokens for trading, to hold and store value, and so forth. Some examples of types of tokens include utility tokens, governance tokens, security tokens, and NFTs. Utility tokens, for example, provide an owner of the token with access to a blockchain-based product or service.

In an additional example of a token, the smart contracts 134 implement NFTs. NFTs include digital assets that are provably unique and as such cannot be duplicated or divided. As such, NFTs are not exchanged as having a same value as coins in cryptocurrency, but rather are digital assets having identifying information recorded as part of the smart contract 134. This identifying information is immutably recorded on that token's blockchain 114 and thus ownership of the token is also recorded and tracked. A variety of information is storable as part of the digital content represented by the NFT, examples of which include digital images, digital media, digital content, executable instructions of an application 132 as described above, secure file links, in-game tokens, digital artwork, and so forth. Other examples of tokens are also contemplated that are fungible and as such are interchangeable with each other.

The client device 106 includes a client blockchain modules 136 that is representative of functionality of the client device 106 to interact with the blockchain system 102. An example of this functionality includes management of a crypto wallet 138, e.g., in local storage device 140. The crypto wallet 138 stores public and private cryptographic keys in this example that are used to support interaction with the blockchain system 102, and more particularly respective accounts 126 of the blockchain system 102, via a user interface 142.

The public key supports transactions to an address of the account 126 derived from the public key, which are stored as part of the blockchain 114 to memorialize the transaction as part of transaction data 120. In one example, an address of an account 126 is generated by first generating a private key, e.g., using a randomization technique. The corresponding public key is derived from the private key and the address of the account 126 is then derived from the public key, e.g., as an entirety of the public key or as a shortened version of the public key. The private key is used to "unlock" transactions that are "locked" by the public key and gain access to the account 126, e.g., access to coins, tokens or other information maintained as part of the transaction.

The blockchain environment 100 also includes a service provider system 104 implementing a service platform 144 of digital services 146, illustrated as maintained in a storage device 148 and are executable via a processing system. Digital services 146 involve electronic delivery of data and implementation of data functionality by computing devices to support a range of computing device operations. Digital services 146, for instance, include creation, management, and dissemination of digital content via the network 108, e.g., webpages, applications, digital images, digital audio, digital video, and so forth. The digital services 146 are also implemented to control access to and transfer of physical goods and services through corresponding digital content, e.g., sales, product listings, advertisements, etc. Digital services 146 further pertain to operation of computational resources (e.g., processing, memory, and network resources) of computing devices that support the access to and management of the digital content by the system.

Functionality of the client device 106 to access the digital services 146 of the service provider system 104 is represented by respective client service module 150. The client service module 150 is configurable as a browser, network-enabled applications, third-party plugins, and so on to access the digital services 146 via the network 108.

The service provider system 104 also includes a reputation manager module 152. The reputation manager module 152 is configured to, via a blockchain interaction manager module 154, manage the transfer of reputation tokens through use of an application 132 generated by the service provider system 104 and executed by the distributed state machine 130. The service platform 144, for instance, includes a digital service 146 configured to support transactions of items, e.g., physical items or digital content, using service provider accounts. Transferring reputation tokens may be initiated by the service platform 144, responsive to a transaction, based on a reputation reward calculated based on data describing the transaction. The blockchain interaction manager module 154 of the reputation manager module 152 of the service platform 144, for instance, initiates, via the blockchain system 102, a transfer ownership of reputation tokens to a blockchain account 126 as part of the blockchain 114, ownership of which is associated with a blockchain account 126 of a participant of the transaction. In this way, execution of the application 132 provides an ability of the service provider system 104 to communicate further with the client device 106.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Generating a Tokenized Reputation Score

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-7.

Figure 2:
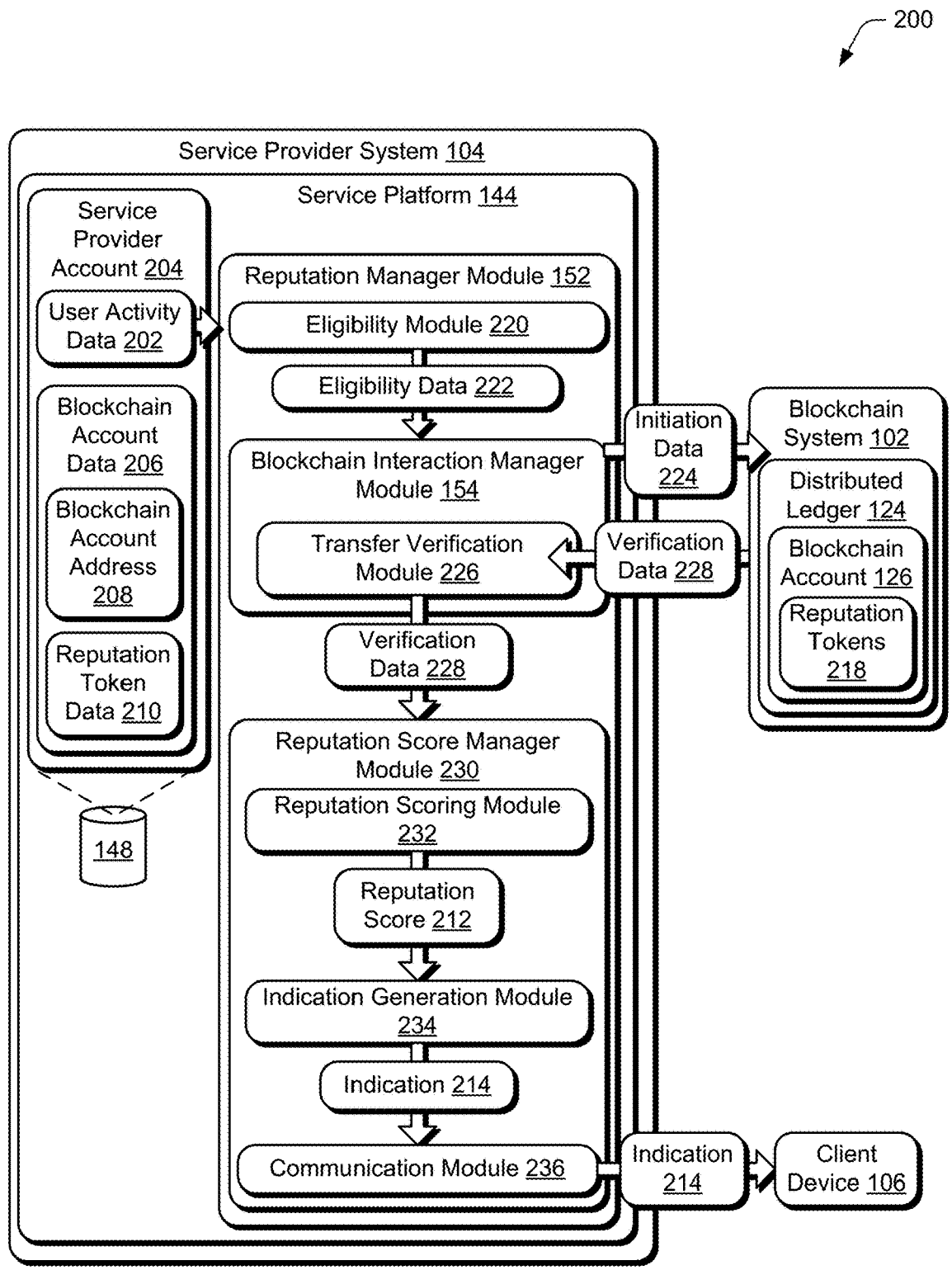
FIG. 2 depicts a system in an example implementation showing operation of a service platform of a service provider system of FIG. 1 in greater detail as generating a reputation score and an indication of a reputation score.

FIG. 2 depicts a system 200 in an example implementation showing operation of a service provider system 104 of FIG. 1 in greater detail as generating a reputation score 212 and an indication 214 of a reputation score 212.

To begin in the illustrated example of FIG. 2, a service provider system 104 includes a service platform 144 having a reputation manager module 152. The service platform 144 of the service provider system 104 is configured to support user activity of client devices (e.g., client device 106), such as transactions, by implementing digital services 146. In one or more implementations, the digital services 146 are executable to initiate transfer of ownership and/or possession of an item to or from the client device 106, a blockchain account 126, and so forth. The reputation manager module 152 is configured to manage, based on user activity data 202 of service provider accounts 204, processes relevant to tokenized reputation scores of service provider accounts 204.

In system 200, the service provider system receives user activity data 202, which is stored as part of a service provider account 204 stored in storage device 148 of the service platform 144 of the service provider system 104. Although the user activity data 202 can be received from various types of sources or computing devices, in one or more implementations, the user activity data 202 is be received from a client device 106 responsive to user input via a client service module 150 that is displayed via a user interface 142 of the client device 106.

The service provider account 204 of storage device 148 further includes blockchain account data 206 including a blockchain account address 208 and reputation token data 210. The service provider account 204 can also include additional data, such as transactional data of the service provider account 204, a service provider account 204 identifier, transactional data of the blockchain account address 208 associated with the service provider account 204, a blockchain account identifier, and so forth.

In system 200, the reputation manager module 152 performs various processes for managing the tokenized reputation of service provider accounts 204. Examples of this include initiation of a calculation of a reputation reward (including reputation tokens 218) to be transferred to a blockchain account address 208 associated with the service provider account, generation of a reputation score 212 affiliated with a service provider account 204, and so forth.

As part of managing the tokenized reputation of service provider accounts 204, the reputation manager module 152 of the service platform 144 receives, via an eligibility module 220, the user activity data 202; the user activity data 202 is data describing user activity associated with the service provider account 204. Based on at least the user activity data 202, the eligibility module 220 determines whether the user activity of the user activity data 202 is eligible for a reputation reward. Because the performance of this determination is via a service provider system 104 off-chain, this effectively avoids inefficient burning of 'gas' that would have resulted if the determination was performed on-chain via a blockchain system 102 instead. If the eligibility module 220 determines that the user activity of the user activity data 202 is eligible for a reputation reward, the eligibility module 220 passes the determination of eligibility as eligibility data 222 to the blockchain interaction manager module 154.

The blockchain interaction manager module 154 is configured to manage interactions with the blockchain system 102 and has a transfer verification module 154. The blockchain interaction manger module 154 initiates a calculation of a reputation reward based on the user activity data 202 by passing initiation data 224 to a blockchain system 102. In one example, the blockchain interaction manger module 154 invokes one or more smart contracts 134 of a blockchain system 102 via the initiation data 224. In one example, the reputation reward indicates reputation tokens 218 to be transferred to a blockchain account address 208 associated with a service provider account 204.

In one example, the blockchain interaction manager module 154 initiates, as part of the initiation of the calculation of the reputation tokens 218, a transfer of the reputation tokens 218 to a blockchain account 126 of the blockchain account address 208 based on the reputation reward calculated. In one example, the blockchain interaction manger module 154 initiates the transfer of the reputation tokens 218 based on the reputation reward calculated via the initiation data 224.

The transfer verification module 226 receives verification data 228 from a blockchain system 102. The verification data 228 indicates that a transfer of reputation tokens 218 to a blockchain account address 208 associated with a service provider account 204 has been successfully completed. In one example, the transfer verification module verifies 226 the successful completion of a transfer of reputation tokens 218 automatically and/or at predefined intervals.

In the illustrated example, a reputation score manager module 230 of the reputation manger module 152 includes a reputation scoring module 232, an indication generation module 234, and a communication module 236. The reputation scoring module 232 manages the reputation score 212 of the service provider account 204 via processes such as receiving verification data 228, generating a reputation score 212 for the service provider account 204, generating an indication 214 of the reputation score 212 of the service provider account 204, and so forth.

The reputation scoring module 232 is configured to generate a reputation score 212 based on an amount of reputation tokens 218 associated with the blockchain account address 208 of the blockchain account 126. The indication generation module 234 generates an indication 214 of the reputation score 212 displayable in relation to the service provider account 204. The reputation score 212 can be expressed in a variety of ways, including but not limited to a normalized score, a ranking, a probability, a percentage, a fraction, semantically, numerically, as digital content, or so forth.

In this example illustration, the communication module 236 is configured to display the indication 214 of the reputation score 212 of the service provider account 204. In at least one example, the indication 214 of the reputation score 212 of the service provider account 204 is displayed via a client device 106. Therefore, in this manner, the service provider system 104 generates a tokenized reputation score 212 of the service provider account 204 based on an amount of reputation tokens 218 associated with a blockchain account address 208 associated with the service provider account 204.

Figure 3:
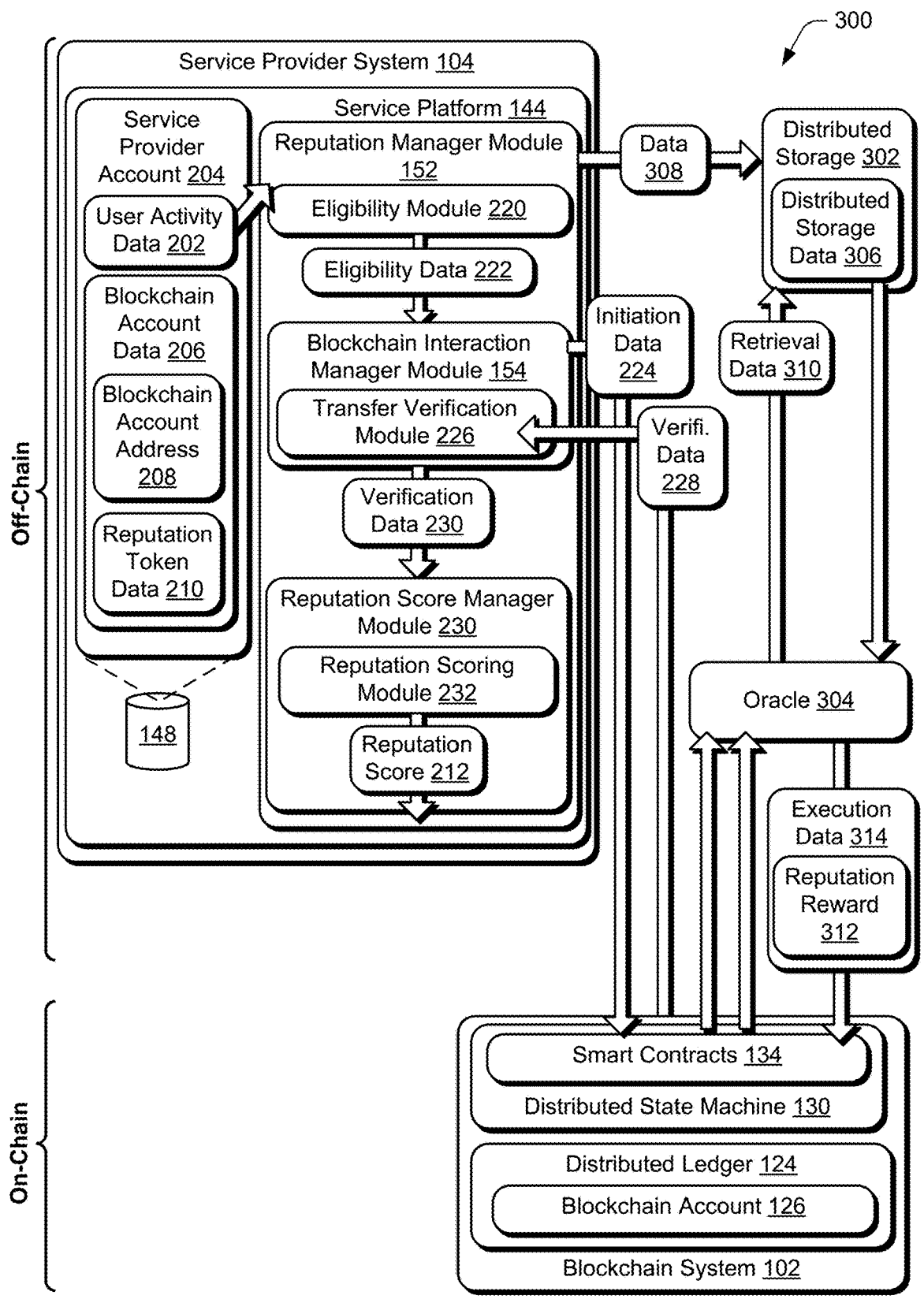
FIG. 3 depicts a system in an example implementation in which smart contracts of a distributed state machine of a blockchain system are used to mint and transfer reputation tokens.

FIG. 3 depicts a system 300 in an example implementation in which smart contracts 134 of a distributed state machine 130 of a blockchain system 102 are used to mint and transfer reputation tokens 218 based on a reputation reward 312.

To begin in the illustrated example of FIG. 3, a service provider system 104 includes a service platform 144 having a reputation manager module 152. The service platform 144 of the service provider system 104 is configured to support user activity of client devices (e.g., client device 106), such as transactions, by implementing digital services 146. In one or more implementations, the digital services 146 are executable to initiate transfer of ownership and/or possession of an item to or from the client device 106, a blockchain account 126, and so forth. The reputation manager module 152 is configured to manage, based on user activity data 202 of service provider accounts 204, processes relevant to tokenized reputation scores of service provider accounts 204, such as the initiation of a calculation of a reputation reward 312 and the generation of a reputation score 212.

System 300 also includes a distributed storage 302 and an oracle 304. Like the blockchain system 102, the client device 106, and the service provider system 104 of FIG. 1, the distributed storage 302 and the oracle 304 can also be communicatively coupled, one to another, via the network 108. For instance, the distributed storage 302 and the oracle 304 can be communicatively coupled, one to another, with the blockchain system 102, the client device 106, and the service provider system 104 of FIG. 1.

The distributed storage 302 includes distributed storage data 306. The distributed storage data 306 includes data 308 received from one or more service provider systems 104. In one example, the distributed storage 302 is a distributed public storage. In this manner, the distributed storage data 306 of the distributed storage 302 is transparent to participants of the system 300, such as one or more service provider systems 104, at least regarding blockchain account identifiers or blockchain account addresses.

It is advantageous to store data 308 via a distributed storage 302 because the full replication of blocks 116 of a blockchain 114 across the nodes 110 of the blockchain system 102 has limited storage capacity and limited scalability in comparison to using a distributed storage 302. Storing large amounts of data within a transaction via a blockchain system 102 can be challenging due to the limited size of the transaction and blocks 116 of the blockchain 114. For example, Ethereum has a block gas limit to determine the number, computational complexity, and data size of the transactions included in a block 116. Data cannot take advantage of the immutability or integrity guarantees without being stored on the blockchain. The use of an off-chain distributed storage 302 addresses these issues while ensuring that any given service provider system 104 does not have direct control over the distributed storage 302, and therefore cannot abuse the distributed storage 302.

Oracles 304 provide trustless (or near-trustless) ways of getting off-chain information, such as the distributed storage data 306 of the distributed storage 302, for the use of smart contracts 134 of a blockchain system 102. They can also be used to relay data securely to decentralized application frontends directly. In short, oracles are a mechanism for bridging the gap between off-chain systems and on-chain smart contracts 134.

Oracles 304 provide a few key functions, including the ability to collect data from an off-chain source, transfer the data on-chain with a signed message, and make the data available by putting it in a smart contract's 134 storage. Once the data is available in smart contract's 134 storage, it can be accessed by other smart contracts 134 via message calls that invoke a retrieve function of the oracle's 304 smart contract 134. The data can also be accessed by nodes 110 of a blockchain system 102 or network-enabled clients directly by inspecting an oracle's 304 storage.

Some examples of data that are provided by an oracle 304 include exchange rate data, capital markets data, time and interval data, events occurring on other blockchain systems 102, political events for prediction market resolution, and so forth. In this example, the oracle provides a reputation reward 312 of reputation tokens 218 that is computed to be transferred to a service provider account 204 based on user activity data 202.

In this system 300, the oracle 304 can be any type of oracle, such as a 'request-response', 'publish-subscribe', or 'immediate-read' oracle, a computation oracle, a decentralized oracle, or so forth. In one example, the oracle 304 includes data authentication processes to provide a technical assurance that the data has integrity.

Examples of data authentication processes include authenticity proofs and trusted execution environments. In one example, the oracle 304 retrieves distributed storage data 306 from a distributed storage 302 via retrieval data 310, and thus has integration with the off-chain distributed storage data 306.

Regardless, in this illustrated example, the service provider system 104, the distributed storage 302, and the oracle 304 are off-chain. "Off-chain" does not necessarily mean not on a blockchain. Having a distributed storage 302 and an oracle 304 off-chain provides advantages over on-chain transactions. This is because a typical on-chain transaction is confirmed by nodes 110 on a blockchain 114 before a transaction is marked as completed. This results in higher transactional speed limitations. Regardless, the distributed storage 302 and the oracle 304 are outside of the direct control of any specific service provider system 104.

System 300 also includes smart contracts 134 of a distributed state machine 130 of a blockchain system 102. Like the distributed storage 302 and the oracle 304, the blockchain system 102 is out of the direct control of any specific service provider system. The blockchain system 102, including the smart contract 134, are on-chain, unlike the service provider system 104, the oracle 304, and the distributed storage 302. The smart contracts 134 are configured to support a variety of functionality. Examples of this functionality include interaction with the oracle 304, orchestration of the computation of the reputation reward 312 with the oracle 304, minting reputation tokens 218, transfer of reputation tokens 218 as a reputation reward 312, passing of verification data 228 to the blockchain interaction manager module 154, and so forth.

In system 300, the service provider system receives user activity data 202. The user activity data 202 is data describing user activity associated with the service provider account 204. The user activity data 202 is stored as part of a service provider account 204 stored in storage device 148 of the service provider system 104. The storage device 148 also stores blockchain account data 206 having a blockchain account address 208 associated with the service provider account 204, and reputation token data 210. In one example, the storage device 148 also includes a blockchain account identifier associated with the service provider account 204. Although the user activity data 202 can be received from various types of sources or computing devices, in an implementation the user activity data 202 is received from a client device 106 responsive to user input via a client service module 150.

In system 300, the reputation manager module 152 performs various processes for managing the tokenized reputation of service provider accounts 204. Examples of management of the tokenized reputation include initiation of a calculation of a reputation reward 312 (including reputation tokens 218) to be transferred to a blockchain account address 208, generation of a reputation score 212 affiliated with a service provider account 204, generation of an indication 214 of a reputation score 212 affiliated with a service provider account 204, and so forth.

As part of the management of the tokenized reputation of service provider accounts 204, the reputation manager module 152 passes data 308 to the distributed storage 302.

The data 308 can include the user activity data 202, blockchain account data 206, a blockchain account address 208, a blockchain account identifier, or so forth. Although mapping of a blockchain account identifier or a blockchain account address 208 compromises the complete anonymity of a blockchain account 126 or a service provider account 204, this is utilized as a compromise for a service provider account 204 to receive the reputation rewards 312 described by these techniques.

In one example, the data 308 is normalized data. Data normalization reduces anomalies that complicate data analysis. Anomalies can occur from deleting data, inserting more information, or updating existing information. Data normalization enables increased efficiency and use of the data 308. Normalized data also takes up less space, increases technical performance, and removes redundancies. In one example, the data 308 is passed per a uniform standard that is agreed upon amongst all participating service provider systems 104. Regardless, the data 308 from the service provider system 104 is stored as part of the distributed storage data 306 by the distributed storage 302.

As part of managing the tokenized reputation of service provider accounts 204, the reputation manager module 152 receives, via an eligibility module 220, the user activity data 202. Based on at least the user activity data 202, the eligibility module 220 determines whether the user activity of the user activity data 202 is eligible for a reputation reward 312. If the eligibility module 220 determines that the user activity of the user activity data 202 is eligible for a reputation reward 312, the blockchain interaction manager module 154 receives eligibility data 222 from the eligibility module 220.

As discussed throughout, the blockchain interaction manager module 154 is configured to manage interactions with the blockchain system 102. The blockchain interaction manager module 154 then initiates a process of calculating a reputation reward 312 based on the user activity data 202 and transferring the reputation tokens 218 of the reputation reward 312 to a blockchain account address 208 associated with the service provider account 204. In this example, the blockchain interaction manager module 154 initiates this process by invoking a smart contract 134 via initiation data 224.

As discussed throughout, the smart contract 134 is on-chain. The smart contract 134 responsively orchestrates a computation of the reputation reward 312 with the oracle 304. As previously described, the oracle 304 has integration with the distributed storage data 306 including the data 308 from the service provider system 104. The oracle 304 is configured to execute an algorithm configured to compute the reputation reward 312 based on the user activity data 202 included in the distributed storage data 306, of which the oracle 304 has integration with. The computation of the reputation reward 312 occurs asynchronously. Responsive to the computation of the amount of reputation tokens 218 to be transferred as the reputation reward 312, the oracle 304 executes, via execution data 314, the smart contract 134 callback to execute the minting and/or the transfer of the amount of reputation tokens 218 as the reputation reward 312 to the blockchain account address 208 associated with the service provider account 204. In one example, the creation and the transfer the reputation tokens 218 is a closed system instead of an open system: the amount of reputation tokens 218 of the system 300 is regulated by one or more service provider systems 104. In another example, each service provider account 204 can receive an amount of non-reserved reputation tokens 218 and allocate the techniques described in system 300 in allocations of the non-reserved reputation tokens 218 to blockchain accounts 126 associated with service provider accounts 104. Additionally, or alternatively, the reputation tokens 218 are designed to be non-transferrable or non-tradeable assets. For instance, the reputation tokens 218 can be designed to be non-transferable or non-tradeable assets with the exception of blockchain accounts 126 that are associated with service provider accounts 204.

In this manner, the smart contracts 134 of the blockchain system 102, the oracle 304, and the distributed storage 302 are used by the service provider system 104 to calculate or compute the reputation reward 312 with consistency and transparency. The described techniques also result in a reduction of on-chain computation or storage needs, which can thus scale independently. The described techniques of system 300 ensure the integrity of the minting and transfer of reputation tokens 218, which is importantly designed to protect against abuse from a service provider system 104. The described techniques also provide consistency to the computation of reputation tokens 218, because different service provider systems 104 can have different computation techniques for calculating an amount of reputation tokens 218 to transfer as a reputation reward 312. Moreover, the use of oracles 304, a distributed storage 302, and smart contracts 134 provides transparency to all participants, including service provider systems 104 and service provider accounts 204. The described techniques also improve the cost efficiency involved with 'gas' affiliated with on-chain transactions, while addressing the limitations of on-chain storage limitations.

It is to be appreciated that the described techniques of system 300 to not preclude an independent reputation token management layer, such as the use of the reputation manager module 152, the reputation score manager module 230, or so forth. The use of the described techniques of system 300 also do not preclude the service provider system 104's interpretation of the reputation tokens 218 to generate a reputation score 212 associated with the service provider account 204. This is depicted by the inclusion of the reputation score manager module 230, the reputation scoring module 232, and the reputation score 212 of FIG. 2 in the illustrated example system 200. In this context, consider the following discussion of FIG. 4.

Figure 4:
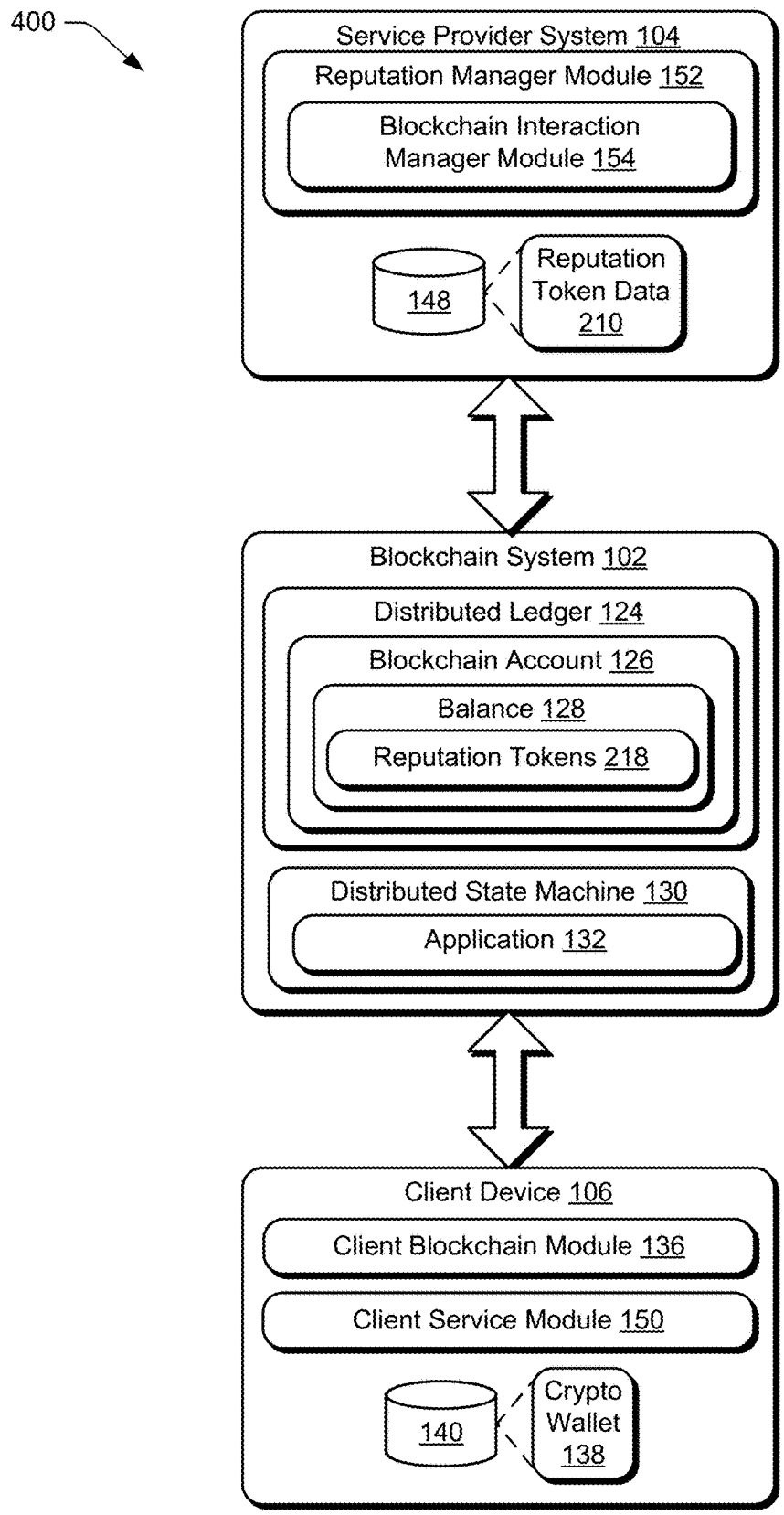
FIG. 4 depicts a system in an example implementation in which execution of the application by a distributed state machine of a blockchain system is used to manage reputation token data.

FIG. 4 depicts a system 400 in an example implementation in which execution of the application 132 by a distributed state machine 130 of a blockchain system 102 is used to manage reputation tokens 218 and reputation token data 210. The blockchain interaction manager module 154 of the service provider system 104 is configured to query an application 132 of the blockchain system 102 for reputation token data 210. The querying of the application 132 can be performed at predefined intervals by the blockchain interaction module 154, for example, responsive to a predefined condition being met. The application 132 of the blockchain system 102 can, for instance, provide input to the blockchain interaction management module 152, that reputation token data 210 is available. For instance, if the amount of reputation tokens 218 in a blockchain account 126 associated with a service provider account 204 of a service provider system 104 changes, input can be provided to the blockchain interaction module 152 that reputation token data 210 is available.

For instance, if a smart contract 134 transfers additional reputation tokens 218 to the blockchain account 126 of the blockchain account address 208, input can be provided to the blockchain interaction module 152 that reputation token data 210 is available. In one or more implementations, the blockchain interaction management module 154 is caused to fetch the reputation token data 210 to be further processed by the reputation manager module 154, e.g., as specified by the service provider system 104 and/or specified upon coding of the application 132 itself.

In this way, the service provider system 104 detects, via reputation token data 210 received, an updated amount of reputation tokens 218 associated with a blockchain account address 208. From this, the service provider system 104 generates a reputation score 212 that is updated based on the updated amount of reputation tokens 218 associated with the blockchain account address 208, generates an updated indication 214 of the updated reputation score 212, and so forth. The updated indication 214 is displayable in relation to a representation of the service provider account 204.

Figure 5:
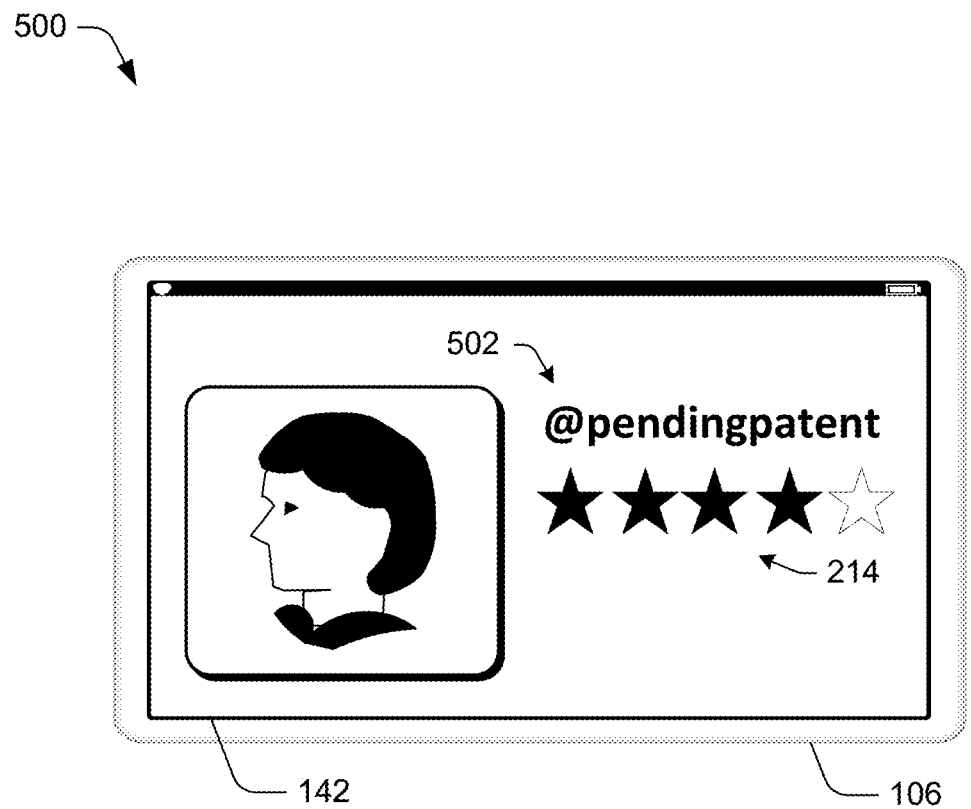
FIG. 5 depicts an example implementation of a user interface of a client device depicting an indication of a reputation score in relation to a representation of a service provider account.

FIG. 5 depicts an example implementation 500 of a user interface 142 of a client device 106 displaying an indication 214 of a reputation score 212 in relation to a representation 502 of a service provider account 204. Illustrated example implementation 500 includes from FIG. 1, an example client device 106 including a user interface 142, e.g., a touchscreen. The depicted example user interface 142 of the client device 106 also displays an example representation 502 of a service provider account 204 of FIG. 2. Although the representation 502 depicted in illustrated example implementation 500 is an online handle ("@pendingpatent"), representations 502 of service provider accounts 204 can be represented in various ways, such as via a digital image, video, digital content, QR code, and so forth.

The illustrated implementation 500 also includes from FIG. 2, an example of an indication 214 of the reputation score 212. Although the indication 214 of the reputation score 212 is depicted in this example implementation 500 as symbols, the indication 214 of the reputation score 212 may be represented in a variety of ways, such as via alphanumeric characters, digital content, categories, and so forth. In this context, consider the following discussion of FIG. 6.

Figure 6:
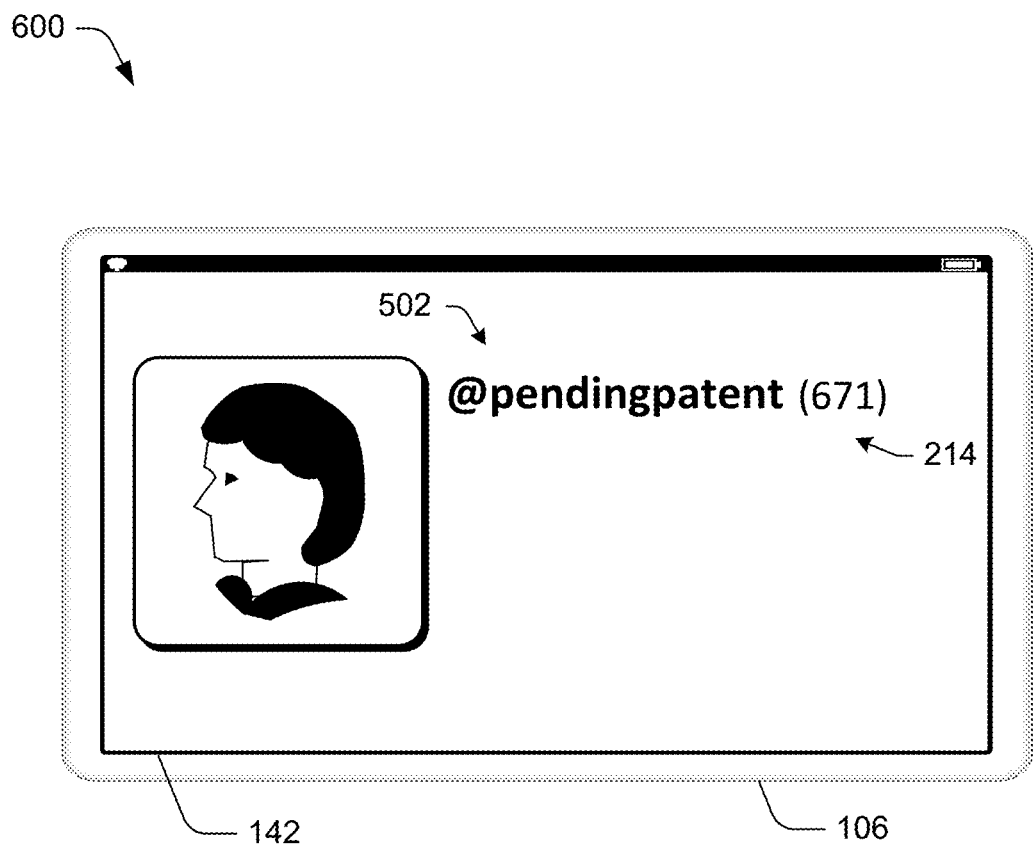
FIG. 6 depicts another example implementation of a user interface of a client device depicting another indication of a reputation score in relation to a representation of a service provider account.

FIG. 6 depicts an example implementation 600 of a user interface 142 of a client device 106 that displays another indication 214 of a reputation score 212 in relation to a representation 502 of a service provider account 204 from FIG. 5. Illustrated example implementation 600 includes from FIG. 1, an example client device 106 including a user interface 142, e.g., a touchscreen. Although the representation 502 depicted in illustrated example implementation 600 is an online handle (e.g., "@pendingpatent"), as already discussed above, representations 502 of service provider accounts 204 can be represented in various ways, such as via a digital image, video, digital content, QR code, and so forth.

The illustrated implementation 600 also includes from FIG. 2, an example of an indication 214 of the reputation score 212. Unlike the example indication 214 depicted in FIG. 5, the example indication 214 of FIG. 6 is a number instead of a series of symbols (e.g., four stars). Although the indication 214 of the reputation score 212 is depicted in this example implementation 600 as a number, as already described regarding the example implementation 500 of FIG. 5, the indication 214 of the reputation score 212 is configurable in a variety of ways, such as via alphanumeric characters, digital content, categories, symbols, and so forth.

Figure 7:
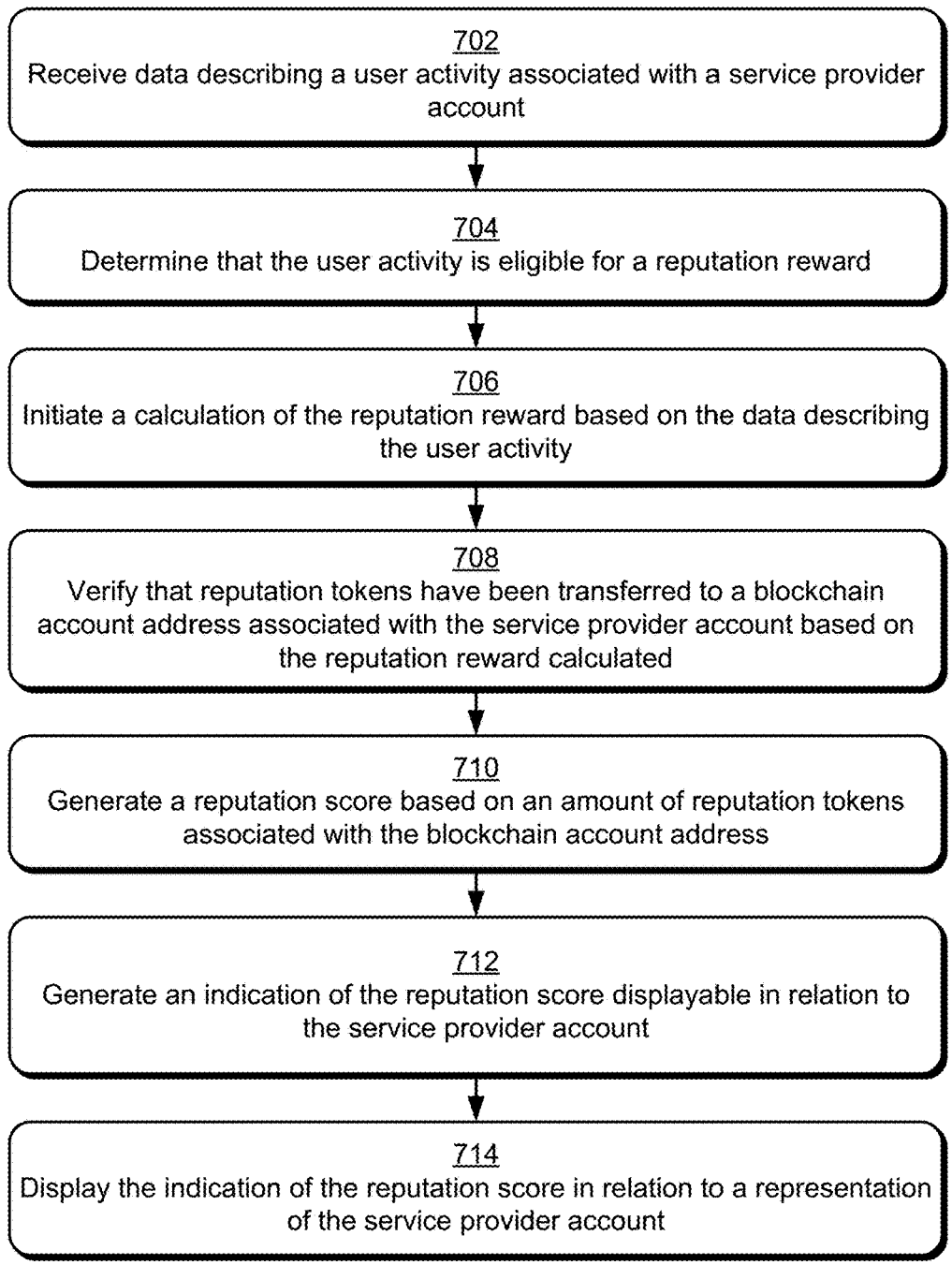
FIG. 7 is a flow diagram depicting a procedure in an example implementation of generation of a tokenized reputation score based on an amount of reputation tokens associated with a blockchain account address associated with a service provider account.

FIG. 7 is a flow diagram depicting a procedure 700 in an example implementation in which a reputation score 212 is generated based on an amount of reputation tokens 218 associated with a blockchain account address 208 associated with a service provider account 204.

To begin in this example, the service provider system 104 receives data 202 describing a user activity associated with a service provider account 204 (block 702). As discussed throughout, the data 202 describing a user activity can include data that is, but is not limited to, nominal, categorical, ordinal, dichotomous, continuous, interval, ratio, or discrete. Additionally, the data 202 describing the user activity can be any type or format of data 202 describing a user activity. As discussed throughout, user activity associated with a service provider account can include various types of user activities associated with a service provider account, such as transaction activity, feedback activity, shipping activity, bidding activity, compensation activity, contribution activity, search query activity, sharing activity, traffic activity, sponsorship activity, collaboration activity, blockchain activity, and so forth. As previously described, the service provider system 104 can receive the data 202 describing the user activity in various ways and from various sources, including via user input provided via a user interface 142 of a client device 106. By way of example, a service provider system 104 receives, from a client device 106, data 202 describing a transaction associated with a service provider account 204.

To continue this example, the service provider system 104 determines that the user activity is eligible for a reputation reward 312 (block 704). By way of example, the service provider system 104 can determine that a successful purchase of a luxury watch by a service provider account 204 is eligible for a reputation reward 312. In one or more examples, the service provider system 104 can determine that the user activity, specifically, is a transaction, and therefore is eligible for a reputation reward 312. Additionally, or alternatively, a determination that a transaction is completed can result in the determination that the user activity is eligible for a reputation reward 312.

Further, the service provider system 104 initiates a calculation of the reputation reward 312 based on the data 202 describing the user activity (block 706). In one or more implementations, the reputation reward 312 is calculated based on a currency value of a transaction. For example, a higher currency value transaction can result in the calculation of a higher reputation reward 312. As an additional example, a lower currency value transaction can result in the calculation of a lower reputation reward 312. In one instance, the reputation reward 312 is calculated based on a type of a user activity, such as a type of a transaction. By way of example, a larger reputation reward 312 can be calculated for a transaction that is of the luxury type in comparison to a normal type of transaction.

To continue this example, the service provider system 104 verifies that reputation tokens 218 have been transferred to transferred to a blockchain account address 208 associated with the service provider account 204 based on the reputation reward 312 calculated (block 708). This verification can be accomplished through various means, such as by completing a call through an application programming interface to a source (e.g., an exchange, an application 132, or so forth). As previously described, the service provider system 104 can verify that the reputation tokens 218 have been transferred to the blockchain account address 208 by querying an application 132 of a blockchain system 102 for relevant data (e.g., transaction data, reputation token data 210, verification data 228, and so forth). The verification processes can be performed automatically.

As discussed throughout, the transfer of the reputation tokens 218 can be from various types of sources, such as a contract address, an external blockchain account address, a wallet address, an exchange (e.g., Coinbase), a wallet provider, and so forth. In one example, an oracle 304 triggers the transfer of reputation tokens 218 by executing a smart contract 134 via execution data 314. In another example, the initiation of the transfer of the reputation tokens 218 includes triggering an execution of a smart contract 134.

To continue this example, the service provider system 104 generates a reputation score 212 based on an amount of reputation tokens 218 associated with the blockchain account address 208 (block 710). As discussed throughout, the reputation score 212 can be generated based on additional data or property associated with the blockchain account address 208, such as NFTs, transactional history data, and so forth.

Further, the service provider system 104 generates an indication 214 of the reputation score 212 displayable in relation to the service provider account 204 (block 712). As discussed throughout, the indication of the reputation score 212 generated can be in any number of formats, such as alphanumeric characters, symbols, digital content, color, and so forth. By way of example, the indication 214 of the reputation score 212 generated can be a number that is displayable in relation to the service provider account 204.

To continue this example, the service provider system 104 displays the indication 214 of the reputation score 212 in relation to a representation (e.g., example representation 502 of FIGS. 5 and 6) of the service provider account 204 (block 714). As discussed throughout, the representation of the service provider account 204 can be in various formats, such as alphanumeric characters, names, QR codes, digital content, and so forth. By way of example, the representation of a service provider account 204 can be an online profile of the service provider account 204. In another example, the representation of the service provider account 204 is an online handle or a digital image (e.g., a profile picture). As discussed throughout, the display of the indication 214 of the reputation score 212 in relation to a representation of the service provider account 204 can be through various computing devices, such as the client device 106.

In accordance with the principles discussed herein, the service provider system 104 generates a reputation score 212 for a service provider account 204, generates an indication 214 of the reputation score 212 displayable in relation to the service provider account 204, and so forth. Having described examples of procedures in accordance with one or more implementations, consider now an example of a system and device that can be utilized to implement the various techniques described herein.

Example System and Device

Figure 8:
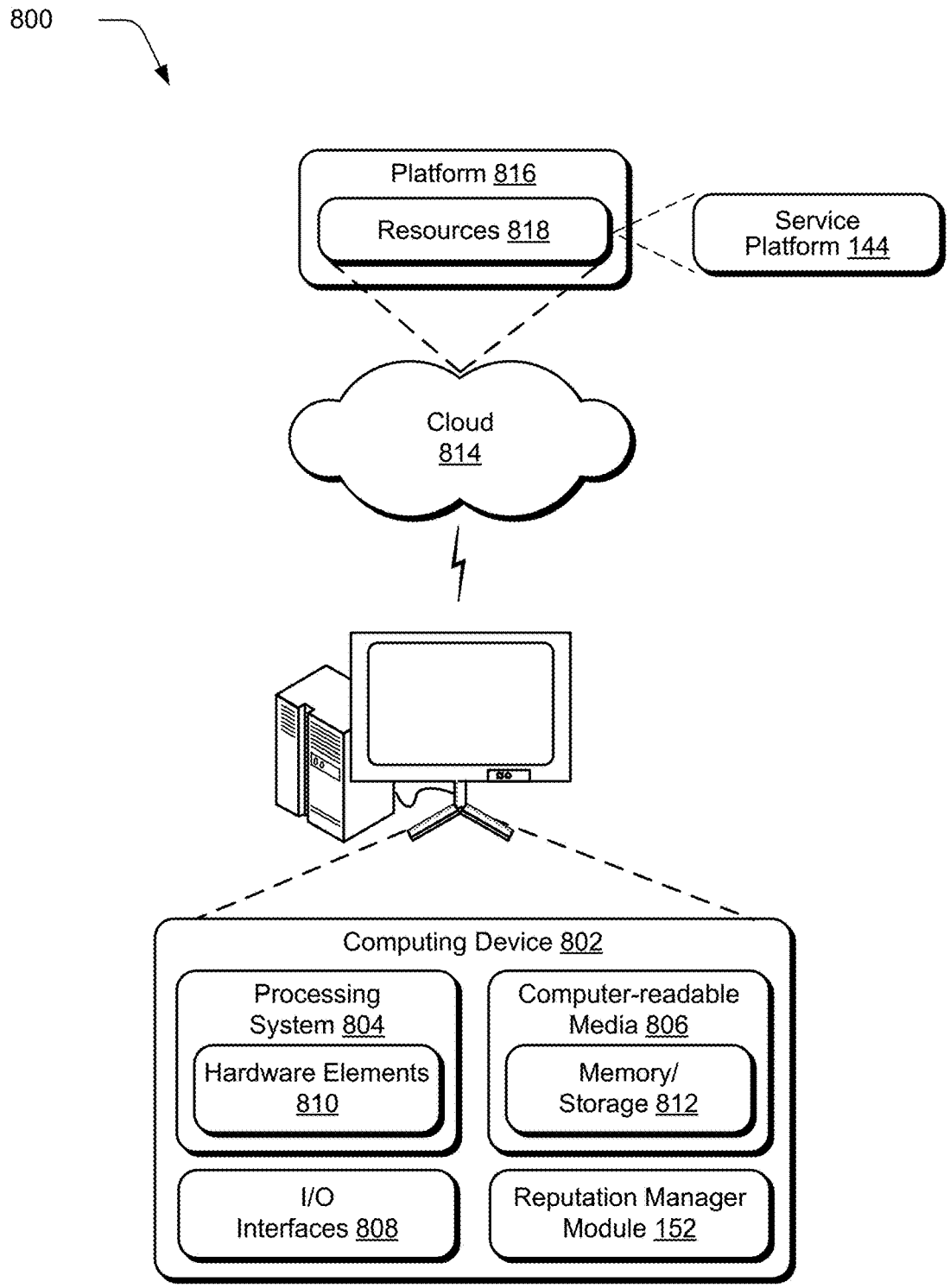
FIG. 8 illustrates an example system including various components of an example device that can be implemented as any type of computing device as described and/or utilize with reference to FIGS. 1-8 to implement embodiments of the techniques described herein.

FIG. 8 illustrates an example system generally at 800 that includes an example computing device 802 that is representative of one or more computing systems and/or devices that may implement the various techniques described herein, such as the nodes 110 of FIG. 1. This is illustrated through inclusion of the service platform 144 and the reputation manager module 152. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media.

The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818, the resources 818 including service platform 144. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   receiving, by the computing device, data describing a user activity associated with a service provider account;
   determining, by the computing device, that the user activity is eligible for a reputation reward;
   initiating, by the computing device, calculation of the reputation reward based on the user activity by invoking one or more smart contracts of a blockchain system;
   verifying, by the computing device, that reputation tokens have been transferred to a blockchain account identifier associated with the service provider account based on the reputation reward calculated by the one or more smart contracts of the blockchain system;
   generating, by the computing device, a reputation score based on an amount of reputation tokens associated with the blockchain account identifier;
   generating, by the computing device, an indication of the reputation score displayable in relation to the service provider account; and
   displaying, by the computing device, the indication of the reputation score in relation to a representation of the service provider account.

2. The method of claim 1, wherein the blockchain system is decentralized.

3. The method of claim 1, wherein the determining that the user activity is eligible further comprises determining that a transaction is successfully completed.

4. The method of claim 1, wherein the reputation reward is calculated based on a type of transaction corresponding to the user activity.

5. The method of claim 1, wherein the determining further comprises determining that a redemption criterion has been met.

6. The method of claim 5, wherein determining that the redemption criterion has been met further comprises establishing that a probability of the user activity being fraudulent is lower than a predetermined threshold.

7. The method of claim 5, wherein determining that the redemption criterion further comprises determining that a value of the reputation reward exceeds a predetermined threshold.

8. The method of claim 1, wherein the reputation tokens are transferred from a different blockchain account identifier having assets to transfer the reputation reward.

9. The method of claim 1, wherein the reputation tokens are transferred from a contract identifier.

10. The method of claim 1, wherein the verifying, by the computing device, further comprises completing a call to an exchange through an application programming interface.

11. The method of claim 1, further comprising:
detecting, by the computing device, an updated amount of reputation tokens associated with the blockchain account identifier;
generating, by the computing device, an updated reputation score based on the updated amount of reputation tokens associated with the blockchain account identifier;
generating, by the computing device, an updated indication of the updated reputation score displayable in relation to the service provider account; and
displaying, by the computing device, the updated indication of the updated reputation score in relation to a representation of the service provider account.

12. One or more non-transitory computer-readable storage media having stored instructions that are executable by at least one processor to perform operations comprising:
receiving data describing a user activity associated with a service provider account;
determining that the user activity is eligible for a reputation reward;
invoking calculation of the reputation reward via one or more smart contracts of a decentralized blockchain system and the data describing the user activity;
verifying that reputation tokens have been transferred to a blockchain account identifier associated with the service provider account based on the reputation reward calculated by the one or more smart contracts of the blockchain system;
generating a reputation score based on an amount of reputation tokens associated with the blockchain account identifier;
generating an indication of the reputation score displayable in relation to the service provider account; and
displaying the indication of the reputation score in relation to a representation of the service provider account.

13. The one or more non-transitory computer-readable storage media of claim 12, wherein execution of the one or more smart contracts is conditional on one or more predefined conditions specified by the one or more smart contracts being met based on the data describing the user activity.

14. The one or more non-transitory computer-readable storage media of claim 12, wherein the determining further comprises determining that a redemption criterion has been met.

15. The one or more non-transitory computer-readable storage media of claim 14, wherein the determining that the redemption criterion has been met comprises establishing that a probability of the user activity being fraudulent is below a predetermined threshold.

16. A system comprising:
a reputation manager module implemented at least partially in hardware of a computing device to receive data describing a user activity associated with a service provider account;
an eligibility module implemented at least partially in the hardware of the computing device to determine that the user activity is eligible for a reputation reward;
a blockchain interaction manager module implemented at least partially in the hardware of the computing device to initiate a calculation of the reputation reward based on the data describing the user activity by invoking one or more smart contracts of a decentralized blockchain system;
a transfer verification module implemented at least partially in the hardware of the computing device to verify that reputation tokens have been transferred to a blockchain account identifier associated with the service provider account based on the reputation reward calculated by the one or more smart contracts of the decentralized blockchain system;
a reputation score manager module implemented as least partially in the hardware of the computing device to generate a reputation score based on an amount of reputation tokens associated with the blockchain account identifier;
a indication generation module implemented as least partially in the hardware of the computing device to generate an indication of the reputation score displayable in relation to the service provider account; and
a communication module implemented as least partially in the hardware of the computing device to display the indication of the reputation score in relation to a representation of the service provider account.

17. The system of claim 16, wherein the reputation tokens are transferred from a contract identifier.

18. The method of claim 1, wherein the invoking of the one or more smart contracts further comprises initiating executing of the one or more smart contracts, in which the executing of the one or more smart contracts is conditional on one or more predefined conditions specified by the one or more smart contracts being met based on the data describing the user activity.

19. The one or more non-transitory computer-readable storage media of claim 12, further comprising:
detecting an updated amount of reputation tokens associated with the blockchain account identifier;
generating an updated reputation score based on the updated amount of reputation tokens associated with the blockchain account identifier;
generating an updated indication of the updated reputation score displayable in relation to the service provider account; and
displaying the updated indication of the updated reputation score in relation to a representation of the service provider account.

20. The system of claim 16, further comprising:
the reputation score manager module implemented as least partially in the hardware of the computing device to detect an updated amount of reputation tokens associated with the blockchain account identifier;
a reputation scoring module implemented as least partially in the hardware of the computing device to generate an updated reputation score based on the updated amount of reputation tokens associated with the blockchain account identifier;

the indication generation module implemented as least partially in the hardware of the computing device to generate an updated indication of the updated reputation score displayable in relation to the service provider account; and the communication module implemented as least partially in the hardware of the computing device to display the updated indication of the updated reputation score in relation to a representation of the service provider account.

* * * * *